United States Patent
Tamura

(10) Patent No.: US 11,687,295 B2
(45) Date of Patent: Jun. 27, 2023

(54) COMPUTER-READABLE MEDIUM, PRINTING SYSTEM, AND METHOD TO PERFORM PRINTING WHILE PREVENTING INSUFFICIENT AMOUNT OF CONSUMABLES

(71) Applicant: BROTHER KOGYO KABUSHIKI KAISHA, Nagoya (JP)

(72) Inventor: Hikaru Tamura, Okazaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/588,461

(22) Filed: Jan. 31, 2022

(65) Prior Publication Data

US 2022/0269450 A1   Aug. 25, 2022

(30) Foreign Application Priority Data

Feb. 25, 2021   (JP) .............................. JP2021-028166

(51) Int. Cl.
*G06F 3/12*   (2006.01)

(52) U.S. Cl.
CPC .......... *G06F 3/1219* (2013.01); *G06F 3/1239* (2013.01); *G06F 3/1253* (2013.01); *G06F 3/1288* (2013.01)

(58) Field of Classification Search
None
See application file for complete search history.

(56) References Cited

U.S. PATENT DOCUMENTS

| 2015/0178654 A1* | 6/2015 | Glasgow | G06Q 10/0875 705/7.25 |
| 2021/0103246 A1* | 4/2021 | Morihara | G03G 15/0863 |

FOREIGN PATENT DOCUMENTS

| JP | 2002-278392 A | | 9/2002 |
| JP | 2003-122209 A | | 4/2003 |
| JP | 2007-86220 A | | 4/2007 |
| JP | 2016206509 A | * | 12/2016 |
| JP | 2020166472 A | * | 10/2020 |

* cited by examiner

*Primary Examiner* — Fan Zhang
(74) *Attorney, Agent, or Firm* — Scully, Scott, Murphy & Presser, PC

(57) ABSTRACT

A non-transitory computer-readable medium stores computer-readable instructions executable by a processor of an information processing device communicable with a printer configured to perform printing until a print permission amount reaches a particular threshold. The instructions are configured to, when executed by the processor, cause the information processing device to obtain a first number of sheets that indicates a remaining number of sheets printable according to consumable information, in response to receiving, via a user interface, an instruction to add an additional print permission amount, obtain a second number of sheets that indicates an additional number of sheets printable by the printer according to the additional print permission amount, determine whether the second number of sheets is more than the first number of sheets, and when determining that the second number of sheets is more than the first number of sheets, cause the user interface to provide a notification.

10 Claims, 10 Drawing Sheets

MANAGEMENT TABLES (KT)

USER MANAGEMENT TABLE (KT1)

| User ID | us1 | us2 | us3 |
|---|---|---|---|
| Password | pw1 | pw2 | pw3 |
| Printable Number of Sheets | pr1 | pr2 | pr3 |

DEVICE MANAGEMENT TABLE (KT2)

| Device ID | dv1 | dv2 | dv3 |
|---|---|---|---|
| Remaining Ink Amount | ink1 | ink2 | ink3 |
| Replacement Request Information | × | ○ | ○ |
| Activation Information | ○ | × | ○ |
| Device Replacement Information | × | ○ | × |
| Device Settings | dc1 | dc2 | dc3 |

FIG. 2

COMPUTER-READABLE MEDIUM, PRINTING SYSTEM, AND METHOD TO PERFORM PRINTING WHILE PREVENTING INSUFFICIENT AMOUNT OF CONSUMABLES

CROSS REFERENCE TO RELATED APPLICATIONS

This application claims priority under 35 U.S.C. § 119 from Japanese Patent Application No. 2021-028166 filed on Feb. 25, 2021. The entire subject matter of the application is incorporated herein by reference.

BACKGROUND

A printer has been known that is configured to store a print permission amount in a memory of a toner cartridge, and when the number of sheets printed by the printer reaches the number of sheets corresponding to the print permission amount, not allow the printer itself to perform printing even if there is still recording agent left in the toner cartridge. The print permission amount is, for instance, information regarding an amount of the recording agent or sheets usable for printing by the printer. The known printer is allowed to continue to perform printing when a user newly adds an additional print permission amount.

SUMMARY

Even though the additional print permission amount is added, when the residual lifetime of consumables for the known printer is insufficient, the printer may be unable to continue printing for the additional print permission amount. In such a case, for instance, the user needs to replace the consumables, and therefore there is a concern that user-friendliness of the printer might be deteriorated.

Aspects of the present disclosure are advantageous to provide one or more techniques to improve user-friendliness of a printer.

According to aspects of the present disclosure, a non-transitory computer-readable medium is provided, which stores computer-readable instructions executable by a processor of an information processing device communicably connected with a printer. The instructions are configured to, when executed by the processor, cause the information processing device to obtain a first number of sheets that indicates a remaining number of sheets printable by the printer according to consumable information. The consumable information represents a usage state of a consumable supply for the printer. The printer is configured to perform printing until a print permission amount different from the consumable information reaches a particular threshold. The print permission amount is information regarding an amount of recording agent or sheets useable by the printer. The instructions are further configured to, when executed by the processor, cause the information processing device to, in response to receiving, via a user interface of the information processing device, an instruction to add an additional print permission amount to the print permission amount, obtain a second number of sheets that indicates an additional number of sheets printable by the printer according to the additional print permission amount. The instructions are further configured to, when executed by the processor, cause the information processing device to determine whether the second number of sheets is more than the first number of sheets, and when determining that the second number of sheets is more than the first number of sheets, cause the user interface to provide a notification.

According to aspects of the present disclosure, further provided is a printing system that includes a printer, and an information processing device communicably connected with the printer. The printer is configured to perform printing until a print permission amount different from consumable information reaches a particular threshold. The print permission amount is information regarding an amount of recording agent or sheets usable by the printer. The consumable information represents a usage state of a consumable supply for the printer. The information processing device include a user interface and a controller. The controller is configured to obtain a first number of sheets that indicates a remaining number of sheets printable by the printer according to the consumable information. The controller is further configured to, in response to receiving, via the user interface, an instruction to add an additional print permission amount to the print permission amount, obtain a second number of sheets that indicates an additional number of sheets printable by the printer according to the additional print permission amount. The controller is further configured to determine whether the second number of sheets is more than the first number of sheets, and when determining that the second number of sheets is more than the first number of sheets, cause the user interface to provide a notification.

According to aspects of the present disclosure, further provided is a method implementable on an information processing device communicably connected with a printer. The method includes obtaining a first number of sheets that indicates a remaining number of sheets printable by the printer according to consumable information. The consumable information represents a usage state of a consumable supply for the printer. The printer is configured to perform printing until a print permission amount different from the consumable information reaches a particular threshold. The print permission amount is information regarding an amount of recording agent or sheets usable by the printer. The method further includes obtaining, in response to receiving via the user interface an instruction to add an additional print permission amount to the print permission amount, a second number of sheets that indicates an additional number of sheets usable by the printer according to the additional print permission amount. The method further includes determining whether the second number of sheets is more than the first number of sheets, and when determining that the second number of sheets is more than the first number of sheets, causing the user interface to provide a notification.

BRIEF DESCRIPTION OF THE DRAWINGS

FIG. 2 shows an example of management tables stored in the server.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

First Illustrative Embodiment

A printing system in a first illustrative embodiment according to aspects of the present disclosure will be described with reference to the relevant drawings.

Figure 1:
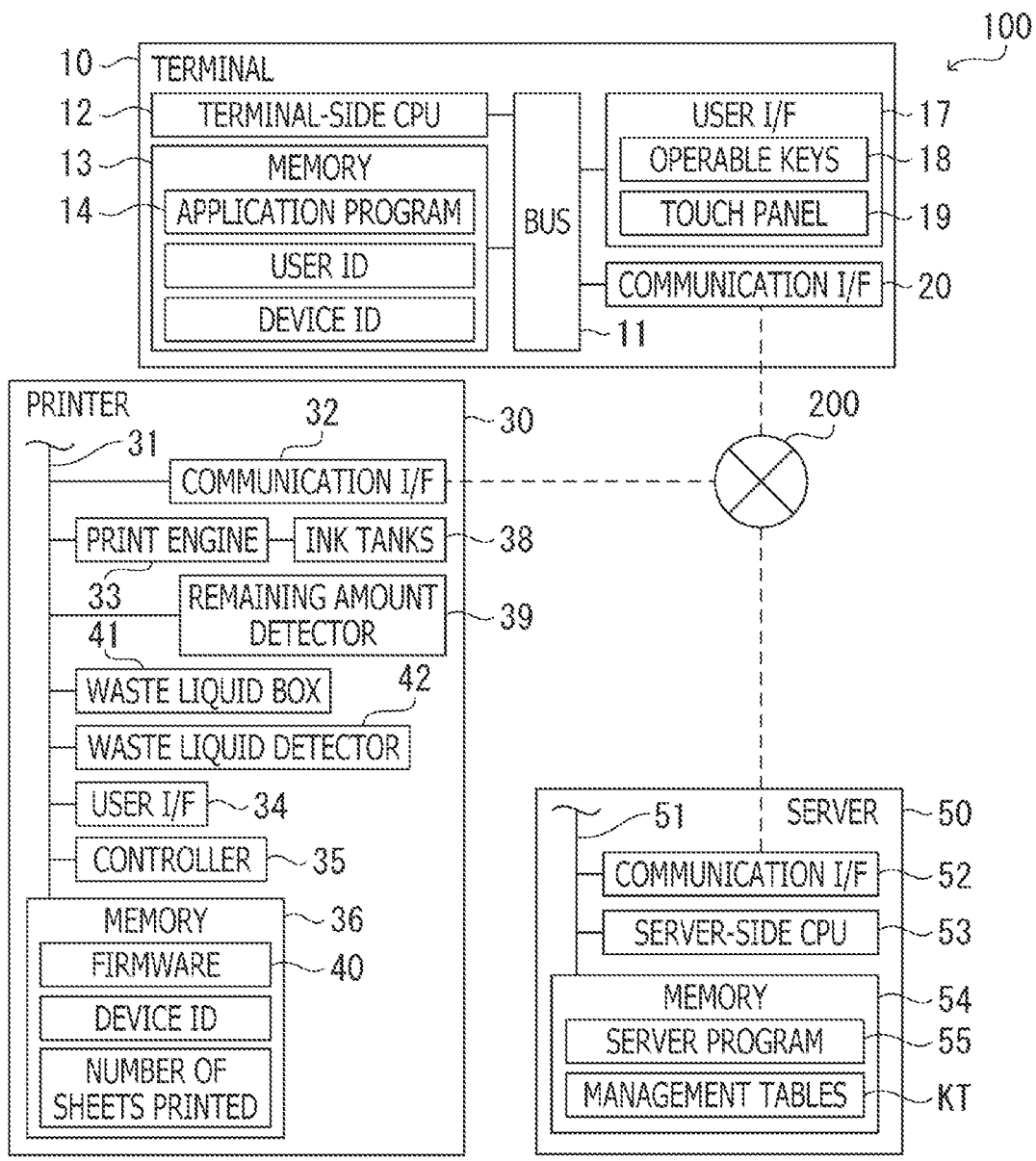
FIG. 1 is a block diagram schematically showing a configuration of a printing system including a terminal, a printer, and a server.

A printing system 100 shown in FIG. 1 includes a terminal 10, a printer 30, and a server 50. The terminal 10, the printer 30, and the server 50 are interconnected via a network 20. In the first illustrative embodiment, the network 200 may include one or more different networks such as the Internet and a LAN ("LAN" is an abbreviation for "Local Area Network"). Moreover, the network 200 may be a wired network, a wireless network, or a combination including a wired network and a wireless network.

A configuration of the terminal 10 will be described. The terminal 10 is a smart phone or a tablet terminal. The terminal 10 includes a bus 11, a terminal-side CPU 12, a memory 13, a user I/F ("I/F" is an abbreviation for "interface") 17, and a communication I/F 20. These elements included in the terminal 10 are communicably interconnected via the bus 11.

The user I/F 17 includes operable keys 18 and a touch panel 19. The touch panel 19 includes a touch sensor. The touch panel 19 is configured to output a signal according to a result of detection by the touch sensor. The term "touch" in the present disclosure includes overall operations to bring an input medium into contact with a display screen of the touch panel 19. Moreover, the concept of the "touch" may include bringing the input medium in proximity to or within a very short distance from the display screen of the touch panel 19. Furthermore, examples of the input medium may include, but are not limited to, a user's finger, a stylus, and a touch pen.

The communication I/F 20 is configured to connect the terminal 10 with the network 200 in accordance with a particular communication protocol. For instance, the communication I/F 20 may perform Wi-Fi wireless communication ("Wi-Fi" is a registered trademark of the non-profit Wi-Fi Alliance) based on the IEEE 802.11 standard and equivalent standards. Moreover, for instance, the communication I/F 20 may perform, with the printer 30, short-range wireless communication such as Bluetooth communication ("Bluetooth" is a registered trademark of Bluetooth SIG, Inc.). Furthermore, the communication I/F 20 may perform wireless communication using a mobile communication system via a base station.

The memory 13 stores a user ID, a device ID, an OS (not shown, "OS" is an abbreviation for "Operating System"), and an application program 14. The user ID is information for identifying a user who is authorized to receive a printing service from the server 50. The device ID is information for identifying a device to receive the printing service from the server 50. The user ID and the device ID will be described later in detail. The terminal-side CPU 12 is configured to receive the printing service from the server 50 by executing the application program 14 under execution of the OS. The printing service will be described later. Hereinafter, the application program 14 may be referred to simply as the "application 14." Moreover, the CPU executing a program may be referred to simply with a name of the program. For instance, a description "the application 14" may denote "the terminal-side CPU 12 that executes the application 14."

The present disclosure basically shows processes to be performed by CPUs in accordance with instructions described in programs. Namely, each of processes such as "determining," "judging," "extracting," "selecting," "calculating," "specifying," "identifying," "obtaining," "acquiring," "receiving," "accepting," and "controlling" in the following description may represent a process by a CPU or a controller. Processes by CPUs may include hardware control via OSs. It is noted that "obtaining" or "acquiring" may be used as a concept that does not necessarily require a request. Namely, a process of each program receiving data without making a request for the data may be included in a concept of "a corresponding CPU obtaining (acquiring) the data." Further, "data" in the present disclosure may be expressed in a computer-readable format. Additionally, a plurality of pieces of data having substantially the same meaning or content but expressed in different formats shall be treated as the same data. The same may apply to "information" in the present disclosure.

Next, the printer 30 will be described. The printer 30 includes a bus 31, a communication I/F 32, a print engine 33, a user I/F 34, a controller 35, a memory 36, a plurality of ink tanks 38, a remaining amount detector 39, a waste liquid box 41, and a waste liquid detector 42. These elements included in the printer 30 are communicably interconnected via the bus 31.

The communication I/F 32 has substantially the same configuration as the communication I/F 20 of the terminal 10. The user I/F 34 has substantially the same configuration as the user I/F 17 of the terminal 10. Specifically, the user I/F 34 includes a touch panel, and operable keys as physical keys.

The print engine 33 is configured to perform a printing operation to print an image on a recording medium such as a sheet or a disk. The print engine 33 is an ink-jet type device that includes a recording head configured to eject ink as recording agent onto the recording medium. The print engine 33 is connected with the plurality of ink tanks 38 configured to store ink. In the first illustrative embodiment, there are four types of ink (e.g., cyan, magenta, yellow, and black). For each type of ink, a corresponding one of the plurality of ink tanks 38 is provided. In the first illustrative embodiment, each ink tank 38 is unable to be re-filled with ink. In addition, each ink tank 38 is fixedly attached to the printer 30. Namely, each ink tank 38 is attached to the printer 30 in an unremovable manner. When a remaining amount of ink stored in an ink tank 38 is insufficient, a below-mentioned replacement request needs to be made to replace the printer 30.

The remaining amount detector 39 is configured to detect the remaining amount of ink stored in each of the ink tanks 38 for the respective different colors. In the first illustrative embodiment, the remaining amount detector 39 is disposed at each ink tank 38. The remaining amount detector 39 includes an optical sensor configured to detect the remaining amount of ink by detecting a liquid face level (height) of the ink in each ink tank 38.

The waste liquid box 41 is configured to store ink suctioned from the recording head by a pump (not shown). The waste liquid detector 42 is configured to detect an amount of ink stored in the waste liquid box 41. In the first illustrative embodiment, the waste liquid detector 42 is disposed at the waste liquid box 41. The waste liquid detector 42 includes an optical sensor configured to detect the amount of the waste liquid by detecting a liquid face level (height) of the ink in the waste liquid box 41.

The controller 35 includes a CPU and an ASIC ("ASIC" is an abbreviation for "Application Specific Integrated Circuit"). The controller 35 is configured to control an operation of each of the elements (e.g., the print engine 33 and the user I/F 34) included in the printer 30. The memory 36 stores various programs and various types of data. For instance, the memory 36 may include one or more storage devices such as RAMs, ROMs, and flash memories. Moreover, the memory 36 may include a computer-readable storage medium that is readable by the controller 35. Examples of the computer-readable storage medium may include, but are not limited to, recording media such as a CD-ROM and a DVD-ROM.

The memory 36 stores firmware 40 that is a control program for the printer 30. The controller 35 executes the firmware 40, thereby performing a printing process. The memory 36 stores information used in a below-mentioned printing service. Specifically, the memory 36 stores a "device ID" and a "number of sheets printed." The device ID is information used by the server 50 to identify the printer 30 in providing the below-mentioned printing service. The number of sheets printed is a total number of sheets actually printed by the print engine 33 in a state where the printer 30 is unable to communicate with the server 50. The state where the printer 30 is unable to communicate with the server 50 is caused due to a disconnection of the network 200 or a failure of the communication I/F 32. It is noted that the number of sheets printed is zero when the printer 30 and the server 50 are communicably connected with each other.

Subsequently, a configuration of the server 50 will be described. The server 50 includes a bus 51, a communication I/F 52, a server-side CPU 53, and a memory 54. The server 50 is configured to provide various services to the terminal 10. More specifically, in the first illustrative embodiment, the server 50 is configured to provide a printing service to a user who operates the terminal 10.

The user makes a request for the printing service to a vendor by operating the terminal 10. In response to receiving the request from the user, the vendor sends the printer 30 to the user. The printer 30, sent by the vendor to the user, is filled with a necessary amount of ink for printing a certain number of sheets (e.g., 2000 sheets+α) that is equal to or more than a particular printable number of sheets granted to the user. The printable number of sheets indicates the number of sheets that the user is permitted to print by the printer 30. Therefore, in this printing service, the user does not need to perform troublesome operations such as filling the printer 30 with ink and replacing an ink cartridge, during a period of time from when the user has obtained the printer 30 until when the user starts printing for the printable number of sheets granted to the user after payment of an initial fee. If the user wants to print more than the particular printable number of sheets granted after the payment of the initial fee, the user may pay an additional charge to the server 50, thereby purchasing an additional printable number of sheets to increase the printable number of sheets. Hereinafter, the newly-purchased additional printable number of sheets may be referred to as a "charge number of sheets." Afterward, when the remaining amount of ink in the printer 30 is about to be insufficient, the user may send to the server 50 a request for replacement of the printer 30. Thereby, the user is allowed to continue the printing service using a new printer 30 sent by the vendor.

The memory 54 of the server 50 stores therein a server program 55 and management tables KT. The server program 55 is a control program for the server 50. As shown in FIG. 2, the management tables KT store necessary information for using the printing service. The management tables KT include a user management table KT1 and a device management table KT2. The user management table KT1 stores information regarding users who use the printing service. Specifically, the user management table KT1 contains user IDs each of which is registered in association with a password and a printable number of sheets. Each user ID and the password associated therewith are used when a corresponding user uses the application 14, and are registered in the server 50 at the time of initial setting of the printer 30.

The printer 30 is allowed to perform printing up to an upper limit number of sheets as the printable number of sheets stored in the user management table KT1. Namely, the printable number of sheets is reduced for the number of sheets printed by the printer 30 being subtracted therefrom. Further, each user may pay an additional charge to purchase the charge number of sheets, thereby increasing the printable number of sheets.

The device management table KT2 stores information regarding devices. Specifically, the device management table KT2 contains device IDs each of which is registered in association with a remaining ink amount, replacement request information, activation information, device replacement information, and device settings. Each device ID, and the remaining ink amount, the replacement request information, and the activation information as associated with each device ID are registered in the server 50 at the time of the initial setting of the printer 30.

Each remaining ink amount indicates the remaining amount of ink detected by the corresponding remaining amount detector 39, and is transmitted by the printer 30 at a particular timing. The replacement request information indicates whether a request for replacement of the printer 30 has been sent to the server 50. When the replacement request information is set to an ON state "o," the replacement request information indicates that a request for replacement of the printer 30 has already been sent. Meanwhile, when the replacement request information is set to an OFF state "x," the replacement request information indicates that a request for replacement of the printer 30 has not yet been sent.

The activation information shows to the server 50 whether the initial setting of the printer 30 has been completed. When the activation information is set to an ON state "o," the activation information indicates that the printer 30 is allowed to perform printing. Meanwhile, when the activation information is set to an OFF state "x," the activation information indicates that the printer 30 is restricted from performing printing.

The device replacement information indicates whether replacement of the printer 30 has already been completed after transmission of a request for replacement of the printer 30. When the device replacement information is set to an ON state "o," the device replacement information indicates that replacement of the printer 30 has already been completed. Meanwhile, when the device replacement information is set to an OFF state "x," the device replacement information indicates that replacement of the printer 30 has not yet been completed. The device settings indicate available functions (e.g., copying and scanning) of the printer 30 and settings (e.g., a sheet size, color/monochrome, and a magnification) for each function.

Next, the printing service using the printing system 100 will be described. First, when receiving the printer 30 sent by the vendor, the user performs an initial setting process in order to start using the printing service. The initial setting process is performed by the application 14 (more exactly, by the terminal-side CPU 12 executing the application 14) stored in the terminal 10, for instance, when the printer 30 is communicably connected with the terminal 10 after the printer 30 is powered on. In the initial setting process, first, in response to a registration operation by the user on the terminal 10, each item (e.g., the user ID, the password, and the printable number of sheets) of the user management table KT1 is registered with the server 50. The printable number of sheets to be registered in the initial setting process is the particular printable number of sheets granted to the user by the vendor.

Subsequently, the application 14 registers, with the server 50, each item of the device management table KT2 in association with the previously-registered user management table KT1. For instance, the application 14 causes the user I/F 17 to display a screen for receiving an operation to select a printer to be used in the printing service. Specifically, for instance, the application 14 causes the user I/F 17 to display names of one or more printers that have responded to the terminal 10 among printers connected with the network 200. In response to receiving an operation to select a printer via the screen, the application 14 sends a device selection signal to the selected printer in order to set the selected printer as a device to be used in the printing service. After receiving the device selection signal from the terminal 10, the printer sends a device ID thereof, a remaining amount of ink therein, and device settings therefor, to the terminal 10. In response to receiving the device ID, the remaining amount of ink, and the device settings from the printer, the application 14 causes the server 50 to register each piece of the received information in the device management table KT2. After completion of the initial setting process, the server 50 may send to the terminal 10 a token for identifying the terminal 10.

Figure 3:
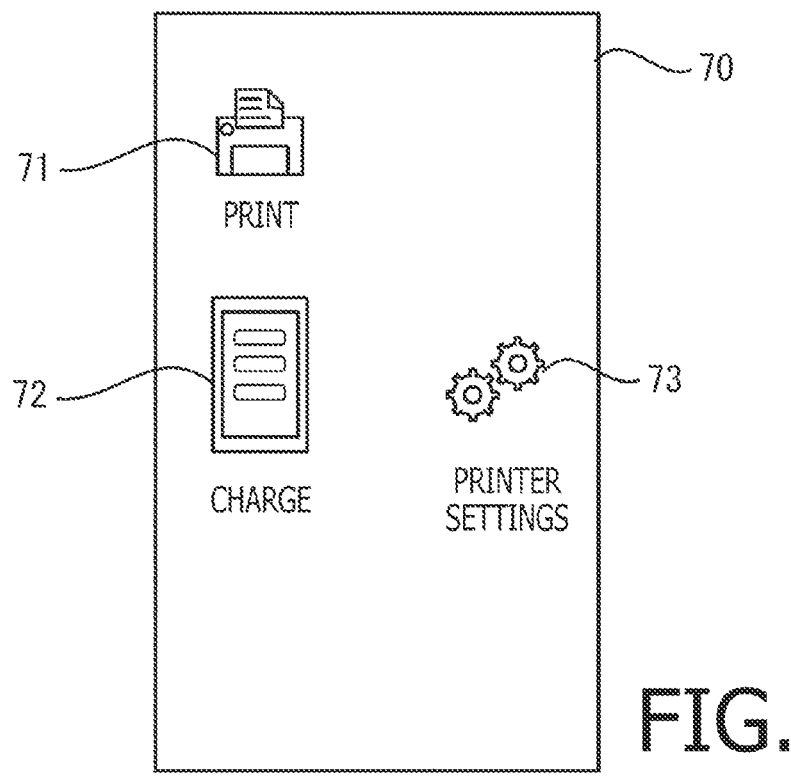
FIG. 3 shows an example of a top screen displayed on the terminal.

To perform printing in the printing service, the user activates the application 14 and causes, via the application 14, the touch panel 19 of the terminal 10 to display a top screen 70 (see FIG. 3). The top screen 70 includes a print icon 71, a charge icon 72, and a printer settings icon 73. The print icon 71 is an operable object to be operated by the user to cause the printer 30 to perform printing in the printing service. The charge icon 72 is an operable object to be operated by the user to purchase the charge number of sheets from the server 50. The printer settings icon 73 is an operable object to be operated by the user to change setting information for the printer 30.

In response to detecting that the print icon 71 has been operated on the top screen 70, the application 14 causes the touch panel 19 to display a print execution screen (not shown). On the print execution screen, the application 14 is enabled to receive user operations to input the number of sheets to be printed and the print settings. In response to detecting that a print execution operation has been performed on the print execution screen, the application 14 sends a print file to the printer 30, thereby causing the printer 30 to start printing.

Figure 4:
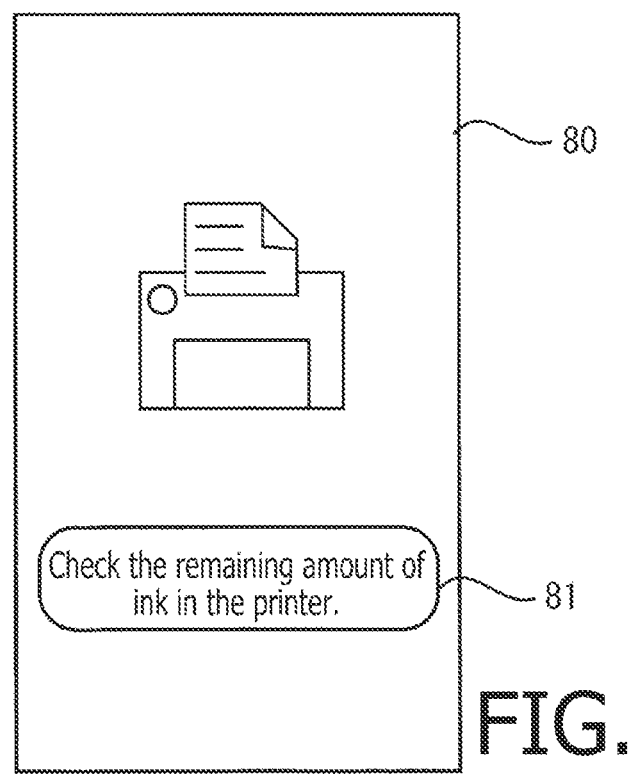
FIG. 4 shows an example of a checking screen.

Next, an explanation will be provided of processes to be performed by the terminal 10, the printer 30, and the server 50, to purchase the charge number of sheets from the server 50. When the charge icon 72 has been operated on the top screen 70, the application 14 causes the touch panel 19 to display a checking screen 80 (see FIG. 4). The checking screen 80 is configured to receive an execution instruction to detect the remaining amount of ink in the printer 30. In response to detecting that an execution icon 81 has been operated by the user on the checking screen 80, the application 14 starts a process shown in FIG. 5. If the execution icon 81 is not operated on the checking screen 80, the application 14 may perform a process to purchase the charge number of sheets from the server 50 in a different manner from the process shown in FIG. 5.

In response to detecting that the execution icon 81 has been operated on the checking screen 80, in S10, the application 14 sends to the server 50 a request for the activation information along with the device ID stored in the memory 14. At this time, the application 14 may send to the server 50 a token for identifying the terminal 10 that is a sender of the request for the activation information, along with the request for the activation information. The token may contain information that enables identification of the user ID for identifying the user who operates the terminal 10.

In reply to the request for the activation information received from the terminal 10, in S11, the server-side CPU 53 of the server 50 sends to the terminal 10 the activation information that is associated with the device ID sent by the terminal 10 on the management tables KT.

In response to receipt of the activation information from the server 50, in S12, the application 14 determines whether activation has been completed for the printer 30 (i.e., whether the printer 30 is permitted to perform printing). As described above, when the activation information is in the ON state "o," the printer 30 specified by the device ID is permitted to perform printing. Meanwhile, when the activation information is in the OFF state "x," the printer 30 specified by the device ID is not permitted to perform printing. When determining that the activation has not been completed for the printer 30 (S12: No), the application 14 terminates the process shown in FIG. 5.

On the other hand, when determining that the activation has been completed for the printer 30 (S12: Yes), in S13, the application 14 determines whether the remaining amount of ink was detected most recently. In the first illustrative embodiment, as will be described below, the application 14 sends a request for the remaining amount of ink to the printer 30 in S14. When the request for the remaining amount of ink was sent to the printer 30 several seconds before the present time, the application 14 determines that the remaining amount of ink was detected most recently (S13: Yes). When determining that the remaining amount of ink was detected most recently (S13: Yes), the application 14 proceeds to S16. Meanwhile, when determining that the remaining amount of ink was not detected most recently (S13: No), the application 14 proceeds to S14 to send the request for the remaining amount of ink to the printer 30.

In reply to the request for the remaining amount of ink received from the application 14, in S15, the firmware 40 of the printer 30 sends a current remaining amount of ink to the terminal 10. Specifically, the firmware 40 causes the remaining amount detector 39 to detect the remaining amount of ink and sends to the terminal 10 the remaining amount of ink detected by the remaining amount detector 39.

Figure 6A:
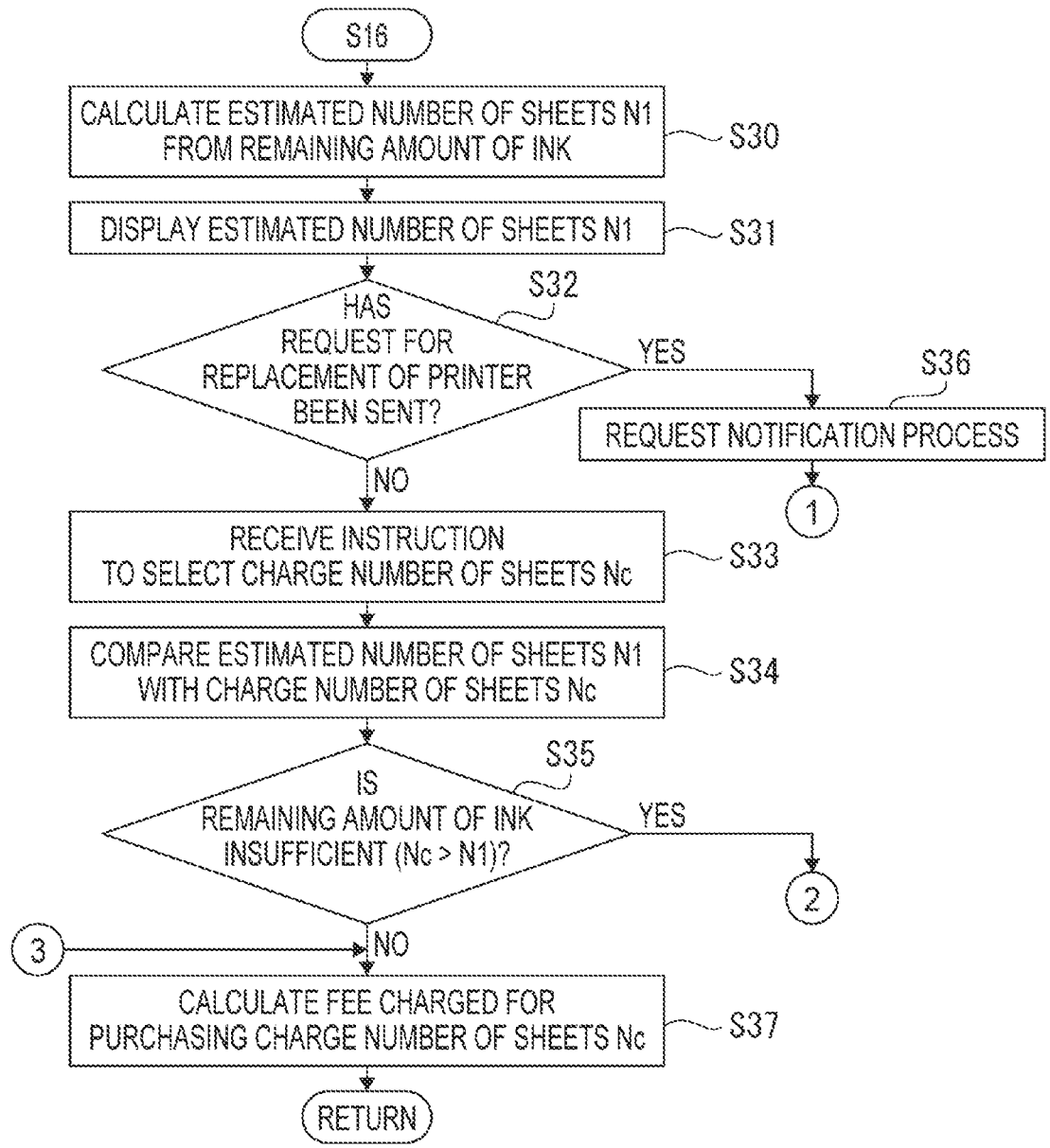
FIGS. 6A and 6B are flowcharts showing a procedure of a charge process to be performed by the terminal in S16 of FIG. 5.
Figure 6B:
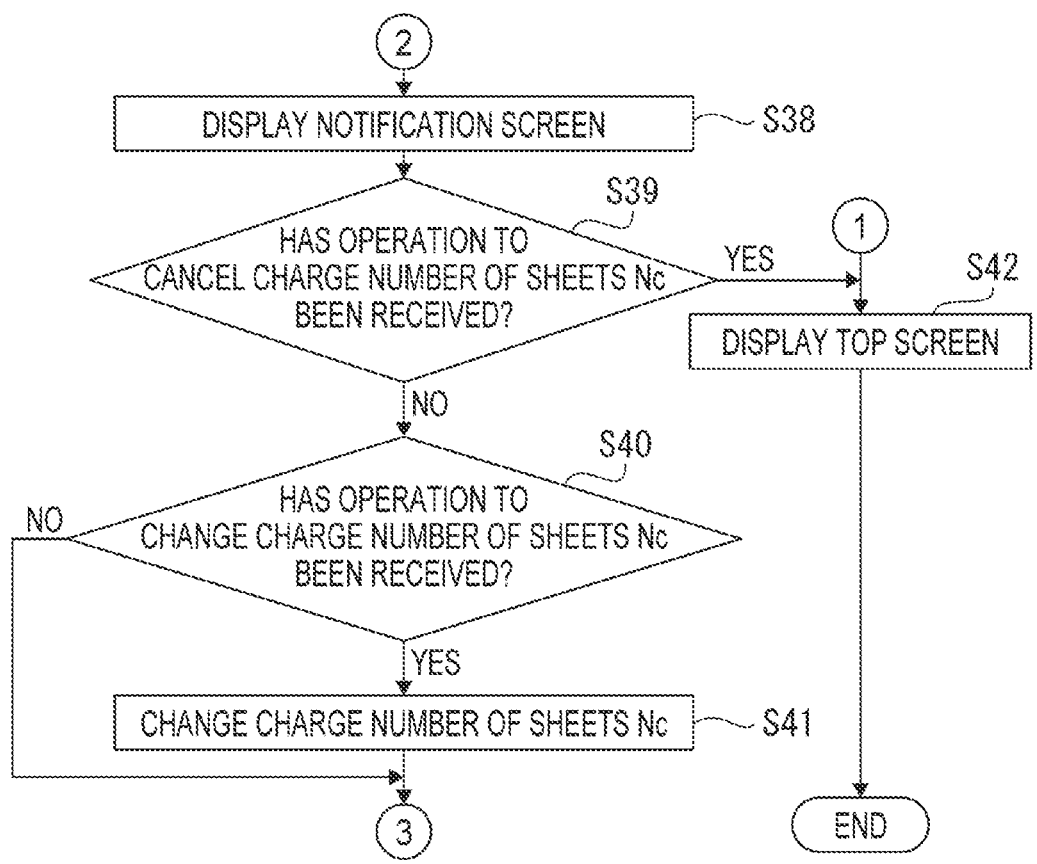

In S16, the application 14 performs a charge process. In the charge process, a charge number of sheets Nc to be purchased from the server 50 is set according to a user operation. FIGS. 6A and 6B are flowcharts illustrating a procedure of the process to be performed by the application 14 in S16.

In S30, the application 14 calculates an estimated number of sheets N1 using the remaining amount of ink. The estimated number of sheets N1 is information representing an estimated number of sheets printable by the printer 30 with the current remaining amount of ink. Specifically, when determining in S13 that the remaining amount of ink was not detected most recently (S13: No), the application 14 calculates the estimated number of sheets N1 using the remaining amount of ink received in S15 from the printer 30. Meanwhile, when determining that the remaining amount of ink was detected most recently (S13: Yes), the application 14 calculates the estimated number of sheets N1 using the already-obtained remaining amount of ink. In the first illustrative embodiment, the application 14 calculates the estimated number of sheets N1 for each color (e.g., cyan, magenta, yellow, and black) of ink stored in the corresponding ink tank 38.

In the first illustrative embodiment, the printer 30 stores history information in the memory 36 for each execution of the printing process. The application 14 of the terminal 10 obtains the history information from the printer 30 and calculates the estimated number of sheets N 1. Specifically, the history information contains values that have been heretofore set for print quality and a sheet size in the printing process. The "print quality" is information representing the quality of images formed on sheets. For instance, the print quality becomes higher in the order of "high speed," "normal," "high quality," and "highest quality." Meanwhile, in the order of "high speed," "normal," "high quality," and "highest quality," an amount of ink ejected increases, and therefore the estimated number of sheets N1 decreases. The "sheet size" is information representing a set size of sheets used for printing. As the sheet size increases, an amount of ink consumed per sheet increases, and therefore the estimated number of sheets N1 decreases. It is noted that possible combinations of the "print quality" and the "sheet size" are limited. Namely, selectable values for the "print quality" are limited according to a selected value of the "sheet size." Specifically, most-frequently-set values, among the values heretofore set for the "print quality" and the "sheet size" that are stored in the history information, are used to calculate the estimated number of sheets N1. For instance, the memory 13 may store table information. In this case, the table information may contain a relationship of the estimated number of sheets N1 associated with the remaining amount of ink, the print quality, and the sheet size. Then, the estimated number of sheets N1 may be calculated using the table information.

Figure 7:
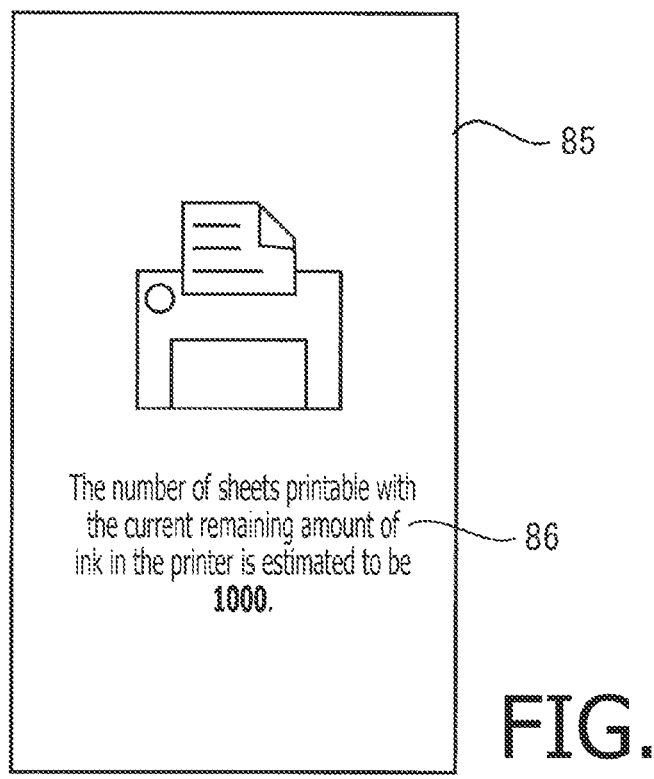
FIG. 7 shows an example of a display screen.

In S31, the application 14 causes the touch panel 19 to display a display screen 85 that includes the estimated number of sheets N1 calculated in S30. FIG. 7 shows an example of the display screen 85 displayed in S31. The display screen 85 includes a text 86 that indicates "1,000 sheets" as the estimated number of sheets N1 calculated in S30. The estimated number of sheets N1 shown on the display screen 85 is the smallest number of sheets among the estimated numbers of sheets N1 for all the colors (e.g., cyan, magenta, yellow, and black) of the ink stored in the ink tanks 38.

In S32, the application 14 determines whether a request for replacement of the printer 30 has been sent to the server 50. When determining that a request for replacement of the printer 30 has been sent to the server 50 (S32: Yes), the application 14 proceeds to S36 to perform a request notification process. Specifically, in the request notification process, the application 14 causes the touch panel 19 to display a text representing that it is not possible to purchase the charge number of sheets Nc from the server 50 since the request for replacement of the printer 30 has been sent to the server 50. After completion of S36, the application 14 proceeds to S42 and causes the touch panel 19 to display the top screen (see FIG. 3). Namely, in this case, the application 14 does not purchase the charge number of sheets Nc from the server 50. This is because the user is likely to have made the request for replacement of the printer 30 after recognizing that a small amount of ink currently left in the printer 30, and it is highly likely that the remaining amount of ink will be insufficient even if the charge number of sheets Nc is purchased. After completion of S42, the application 14 terminates the processes shown in FIGS. 5 and 6.

Figure 8:
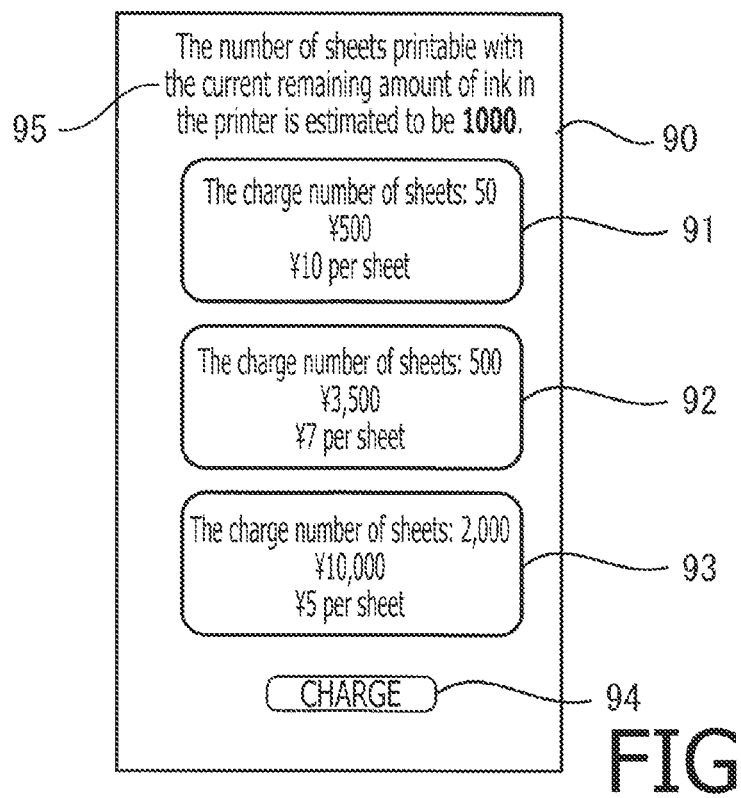
FIG. 8 shows an example of a number-of-sheets selecting screen.

When determining that a request for replacement of the printer 30 has not been sent to the server 50 (S32: No), the application 14 proceeds to S33 to receive a selecting instruction to select the charge number of sheets Nc. Specifically, the application 14 causes the touch panel 19 to display a number-of-sheets selecting screen 90 (see FIG. 8) and receives the selecting instruction according to a user operation to select the charge number of sheets Nc. The number-of-sheets selecting screen 90 shown in FIG. 8 includes selectable icons 91, 92, and 93, a confirmation icon 94, and a text indicating the estimated number of sheets N1. The selectable icons 91, 92, and 93 are operable objects, each of which is configured to be operated by the user to select a corresponding one of available choices (e.g., 50 sheets, 500 sheets, and 2000 sheets) for the charge number of sheets Nc. When the user operates one of the selectable icons 91, 92, and 93 and then operates the confirmation icon 94, the selection of the charge number of sheets Nc is completed. The user is allowed to select one of the selectable icons 91, 92, and 93 while checking or confirming the estimated number of sheets N1 indicated by the text 95 on the number-of-sheets selecting screen 90.

In the first illustrative embodiment, each of the selectable icons 91, 92, and 93 displays thereon a specific number of sheets selectable as the charge number of sheets Nc, as well as a fee charged for purchasing the charge number of sheets Nc and an amount per sheet. For instance, in S33, the application 14 may receive user operations to input the print settings and the sheet size, thereby changing the fee and the amount per sheet according to the input results.

In S34, the application 14 compares the estimated number of sheets N1 calculated in S30 with the charge number of sheets Nc selected in S33. More specifically, in the first illustrative embodiment, the application 14 compares the smallest number of sheets among the estimated numbers of sheets N1 calculated in S30 for all the ink colors with the charge number of sheets Nc. This is because the amount of ink consumed differs for each ink color.

In S35, according to the result of the comparison in S34, the application 14 determines whether the remaining amount of ink in the printer 30 is insufficient. Specifically, when the estimated number of sheets N1 is equal to or more than the charge number of sheets Nc, the application 14 determines that the remaining amount of ink is not insufficient (S35: No). Meanwhile, when the estimated number of sheets N1 is less than the charge number of sheets Nc (Nc>N1), the application 14 determines that the remaining amount of ink is insufficient (S35: Yes).

When determining that the remaining amount of ink is not insufficient (S35: No), the application 14 proceeds to S37. In this case, the application 14 calculates the fee charged for purchasing the charge number of sheets Nc, using the currently selected charge number of sheets Nc. This is because even if the charge number of charge Nc selected by the user is purchased, it is not likely that the remaining amount of ink in the printer 30 will be insufficient.

Figure 9:
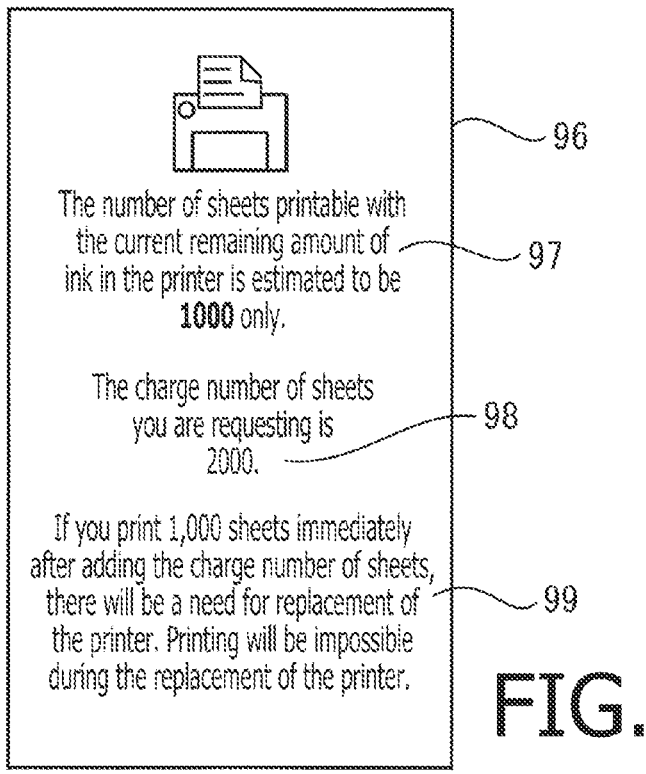
FIG. 9 shows an example of a notification screen.

On the other hand, when determining that the remaining amount of ink is insufficient (S35: Yes), the application 14 proceeds to S38. In S38, the application 14 causes the touch panel 19 to display a notification screen 96 as shown in FIG. 9. The notification screen 96 is configured to provide the user with a notification that the remaining amount of ink is insufficient for the selected charge number of sheets Nc. The notification screen 96 includes a text 97 indicating the currently-calculated estimated number of sheets N1, a text 98 indicating the currently-selected charge number of sheets Nc, and a text 99 for alerting the user.

Figure 10:
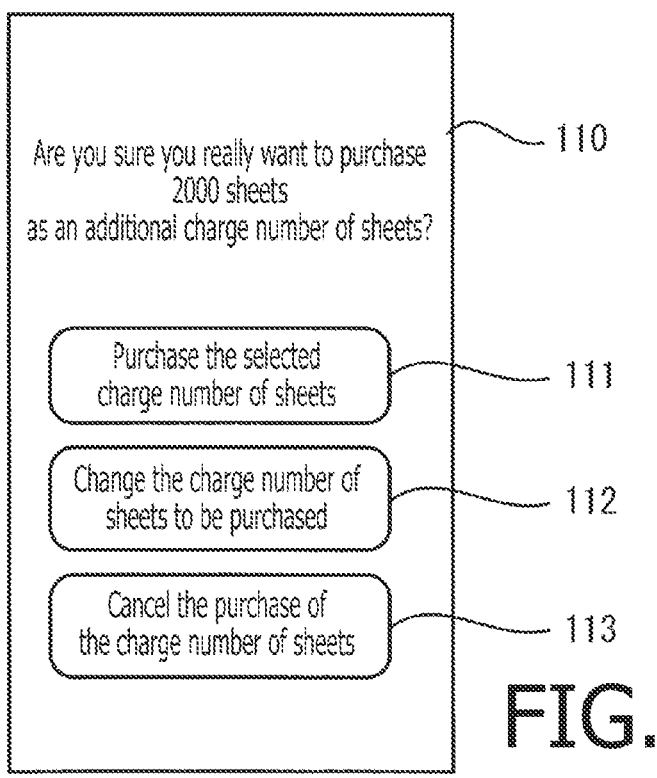
FIG. 10 shows an example of a selection change screen.

In S39, the application 14 determines whether an operation to cancel the charge number of sheets Nc has been received. In the first illustrative embodiment, after a lapse of a particular time from the display of the notification screen 96, a selection change screen 110 (see FIG. 10) is displayed on the touch panel 19. The selection change screen 110 includes icons 111, 112, and 113. The icon 111 is an operable object to be operated to confirm and determine the purchase of the currently-selected charge number of sheets Nc. The icon 112 is an operable object to be operated to change the charge number of sheets Nc. The icon 113 is an operable object to be operated to cancel the purchase of the charge number of sheets Nc. When the user operates the icon 113, the application 14 determines that an operation to cancel the charge number of sheets Nc has been received (S39: Yes), and then proceeds to S42. In S42, the application 14 causes the touch panel 19 to display the top screen 70. Then, the application 14 terminates the processes shown in FIGS. 5 and 6. Namely, in this case, the application 14 does not purchase the charge number of sheets Nc from the server 50.

On the other hand, when the user operates the icon 112 on the selection change screen 110, the application 14 determines that an operation to cancel the charge number of sheets Nc has not been received (S39: No), and then proceeds to S40. In S40, the application 14 causes the touch panel 19 to display the number-of-sheets selecting screen 90 (see FIG. 8) and receives an operation to change the charge number of sheets Nc. When determining that an operation to change the charge number of sheets Nc has been received (S40: Yes), the application 14 proceeds to S41, and change the charge number of sheets Nc according to the received operation. Then, the application 14 proceeds to S37. In this case, in S37, the application 14 calculates the fee charged for purchasing the charge number of sheets Nc, using the changed charge number of sheets Nc.

When the user operates the icon 111 on the selection change screen 110, the application 14 determines in S39 that an operation to cancel the charge number of sheets Nc has not been received (S39: No), then determines in S40 that an operation to change the charge number of sheets Nc has not been received (S40: No), and thereafter proceeds to S37. In this case, in S37, the application 14 calculates the fee charged for purchasing the charge number of sheets Nc, using the currently-selected charge number of sheets Nc. After completion of S37, the application 14 proceeds to S17 in FIG. 5.

In S17, the application 14 sends to the server 50 a charge request including the fee calculated in S16. The charge request is information for making a request for the purchase of the charge number of sheets Nc from the server 50. In response to receipt of the charge request, in S18, the server 50 sends to the terminal 10 a charge instruction indicating the charge number of sheets Nc according to the fee included in the received charge request. The charge instruction is an instruction to add the purchased charge number of sheets Nc to the printable number of sheets.

In S19, the application 14 of the terminal 10 forwards to the printer 30 the charge instruction received from the server 50. In response to receipt of the charge instruction, in S20, the firmware 40 of the printer 30 adds the charge number of sheets Nc to the printable number of sheets, thereby updating the printable number of sheets.

Figure 11:
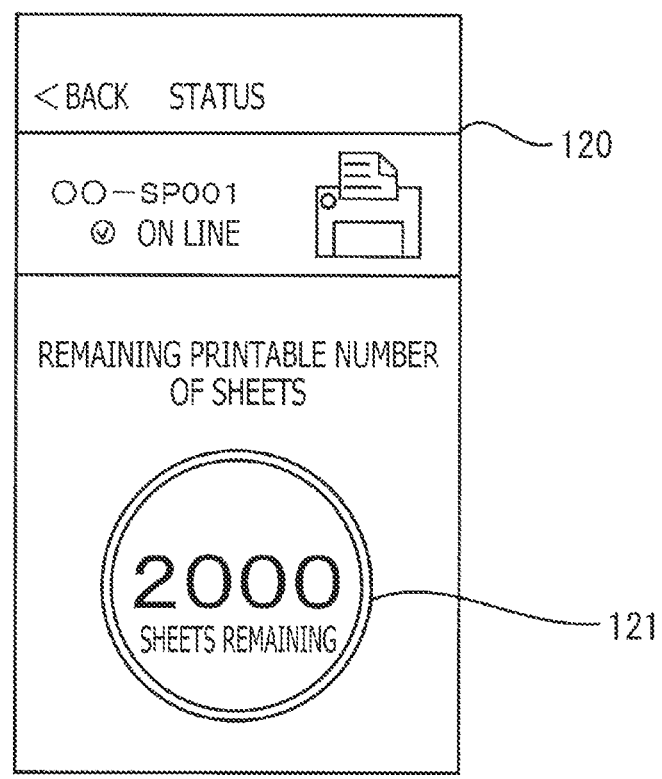
FIG. 11 shows an example of a screen displayed after the purchase of the charge number of sheets has been completed.

In S21, the firmware 40 sends a completion notification to the terminal 10. In S22, the application 14 of the terminal 10 forwards to the server 50 the completion notification received from the printer 30. In response to receipt of the completion notification, in S23, the server 50 increases the printable number of sheets stored in the management tables KT by the purchased charge number of sheets Nc, thereby updating the printable number of sheets. In S24, the server-side CPU 53 sends an update completion notification to the terminal 10. FIG. 11 shows an example of a screen 120 displayed on the touch panel 19 after the application 14 has received the completion notification. The screen 120 shown in FIG. 11 includes a number-of-sheets display image 121 indicating the printable number of sheets updated by the purchase of the charge number of sheets Nc.

In response to receipt of the update completion notification from the server 50, in S25, the application 14 of the terminal 10 determines whether a request for replacement of the printer 30 is required to be made. The application 14 determines that a request for replacement of the printer 30 is required to be made (S25: Yes), when having purchased the charge number of sheets Nc, even after determining that the remaining amount of ink is insufficient (i.e., S35: Yes) in the charge process of S16. When determining that a request for replacement of the printer 30 is required to be made (S25: Yes), the application 14 proceeds to S26 to cause the user I/F 17 to provide a notification that a request for replacement of the printer 30 is required to be made.

The application 14 performs a replacement requesting process in S27. Specifically, in the replacement requesting process, after confirming the notification provided in S26, the user operates the terminal 10 and inputs, via a request screen, request information for requesting delivery of a new printer. The application 14 sends the request information input by the user via the request screen to the server 50 along with a token. The server 50 identifies the device ID of the printer 30 as a requested target from the user ID contained in the token, and then performs a procedure for a new printer to be delivered to the user by changing the state of the replacement request information associated with the identified device ID from the OFF state "x" to the ON state "o."

The first illustrative embodiment described above produces the following advantageous effects. The application 14 of the terminal 10 obtains the estimated number of sheets N1 according to the remaining amount of ink. Further, in response to receipt of an instruction to purchase the charge number of sheets Nc via the user I/F 17, the application 14 determines whether the charge number of sheets Nc is more than the estimated number of sheets N1. When determining that the charge number of sheets Nc is more than the estimated number of sheets N1, the application 14 provides a notification via the user I/F 17. Thereby, the user is allowed to recognize that the remaining amount of ink currently in the printer 30 is insufficient for the charge number of sheets Nc to be purchased. Consequently, the user is allowed to, for instance, change or cancel the charge number of sheets Nc. Thus, it is possible to improve user-friendliness of the printer 30.

When determining that the charge number of sheets Nc is more than the estimated number of sheets N1, the application 14 allows an instruction to change the charge number of sheets Nc to be accepted via the user I/F 17. Thereby, the user is allowed to change the already-selected charge number of sheets Nc after the notification is provided, and for instance, to cause the printer 30 to perform printing while preventing the remaining amount of ink in the printer 30 from being insufficient as much as possible.

When determining that the charge number of sheets Nc is more than the estimated number of sheets N1, the application 14 causes the user I/F 17 to display the estimated number of sheets N1. Thereby, the estimated number of sheets N1 according to the remaining amount of ink currently in the printer 30 is displayed on the user I/F 17. Thus, for instance, it is possible to show a criterion for the user to determine whether to change the charge number of sheets Nc after the notification is provided.

When determining that the charge number of sheets Nc is more than the estimated number of sheets N1, the application 14 causes the user I/F 17 to provide a notification that the printer 30 (or an ink cartridge in another instance where each ink tank 38 is a cartridge configured to be removably attached to the printer 30) needs to be replaced. Thereby, when it is highly likely that the remaining mount of ink in the printer 30 may be insufficient due to the charge number of sheets Nc to be purchased, the notification that the printer 30 (or an ink cartridge) needs to be replaced is provided via the user I/F 17. Hence, it is possible to prompt the user to replace the printer 30 (or an ink cartridge).

When a request for replacement of the printer 30 has not been sent to the server 50, the application 14 causes the user I/F 17 to provide the notification that the printer 30 needs to be replaced. Meanwhile, when a request for replacement of the printer 30 has already been sent to the server 50, the application 14 causes the user I/F 17 to provide a notification that the request for replacement of the printer 30 has already been sent to the server 50 instead of providing the notification that the printer 30 needs to be replaced. Thereby, it is possible to prevent a request for replacement of the printer 30 from being made unnecessarily.

The application 14 is configured to accept an instruction to purchase the charge number of sheets Nc when the printer 30 is activated and ready to perform printing, and not accept an instruction to purchase the charge number of sheets Nc when the printer 30 is not activated. Thereby, it is possible to prevent purchase of the charge number of sheets Nc when the printer 30 is not activated and is unable to perform printing.

The application 14 obtains the remaining amount of ink from the printer 30, and calculates the estimated number of sheets N1 based on the obtained remaining amount of ink and the print settings stored in the history information. Thereby, it is possible to more accurately determine whether the selected charge number of sheets Nc would cause an insufficient amount of ink in the printer 30.

The application 14 determines whether the charge number of sheets Nc is more than the estimated number of sheets N1 that is based on the remaining amount of ink of a particular color. Thereby, even though the consumed amount of ink is different for each user, it is possible to provide an appropriate notification as to whether the selected charge number of sheets Nc would cause an insufficient amount of ink in the printer 30.

Modification of First Illustrative Embodiment

In the aforementioned first illustrative embodiment, the application 14 determines whether the remaining amount of ink is insufficient, by comparing the estimated number of sheets N1 with the charge number of sheets Nc. Instead, for instance, the application 14 may compare a value obtained by adding the charge number of sheets Nc to a current printable number of sheets with the estimated number of sheets N1. In this case, in S33 of FIG. 6A, the application 14 may calculate a second number of sheets by adding the selected charge number of sheets Nc to the current printable number of sheets. In S35, the application 14 may make an affirmative determination (S35: Yes) when the estimated number of sheets N1 is less than the calculated second number of sheets, and then proceed to S38.

In the aforementioned first illustrative embodiment, the printing system 100 employs the printable number of sheets as the print permission amount. Instead, other amounts (e.g., a usable amount of ink in the printing service, the number of ink ejectable times in the printing service, and a usable length of sheets in the printing service) may be employed as the print permission amount. In this case, in S33 of FIG. 6A, for instance, the application 14 may calculate the second number of sheets according to the usable amount of ink or the number of ink ejectable times. Then, in S35, the application 14 may make an affirmative determination (S35: Yes) when the estimated number of sheets N1 is less than the second number of sheets, and proceed to S38.

Second Illustrative Embodiment

In a second illustrative embodiment according to aspects of the present disclosure, different features and configurations from the aforementioned first illustrative embodiment will be described. In the second illustrative embodiment, substantially the same elements as in the first illustrative embodiment are provided with the same reference numerals, and explanations thereof may be omitted.

Figure 12:
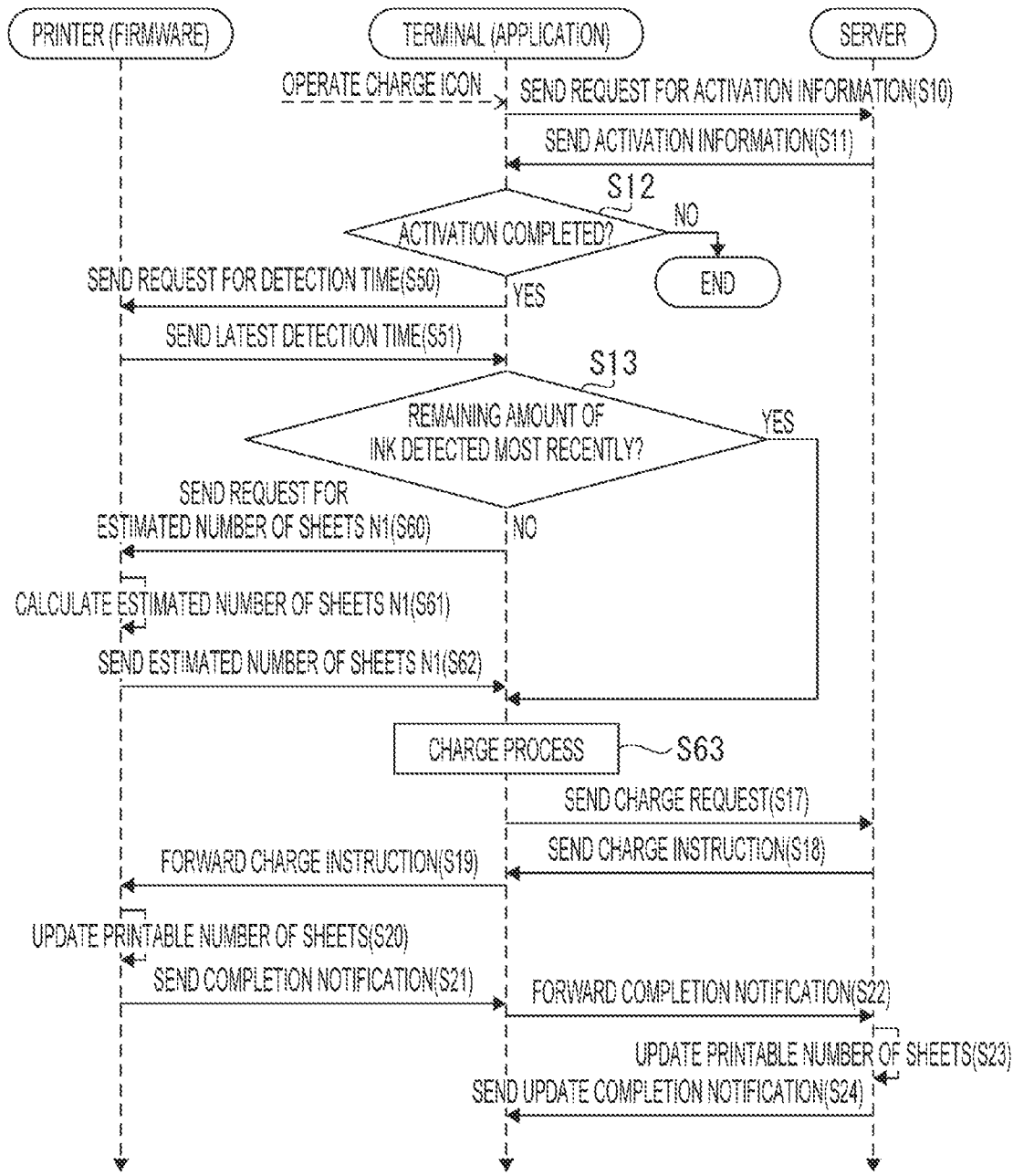
FIG. 12 is a timing chart showing a procedure to purchase the charge number of sheets.

In the second illustrative embodiment, the application 14 obtains the estimated number of sheets N1 calculated by the printer 30. FIG. 12 is a timing chart showing respective processes to be performed by the terminal 10, the printer 30, and the server 50 in purchasing the charge number of sheets Nc from the server 50. In the second illustrative embodiment, the application 14 starts the process shown in FIG. 12 in response to detecting that the execution icon 81 has been operated by the user on the checking screen 80 (see FIG. 4).

In S50, the application 14 sends to the printer 30 a request for a detection time when the remaining amount of ink was detected. In reply to the request for the detection time received from the terminal 10, in S51, the firmware 40 of the printer 30 sends to the terminal 10 a latest detection time when the remaining amount of ink was detected by the remaining amount detector 39.

When determining in S13 that the remaining amount of ink was detected most recently, the application 14 proceeds to S60 to send to the printer 30 a request for the estimated number of sheets N1. In response to receipt of the request for the estimated number of sheets N1 from the application 14, in S61, the firmware 40 of the printer 30 performs substantially the same process as in S30 of FIG. 6A, thereby calculating the estimated number of sheets N1 according to the remaining amount of ink of each color. In S62, the firmware 40 sends the estimated number of sheets N1 to the terminal 10.

In response to receipt of the estimated number of sheets N1 from the printer 30, the application 14 performs a charge process in S63. In the second illustrative embodiment, the application 14 has already obtained the estimated number of sheets N1 from the printer 30. Therefore, in S63, the application 14 performs a process that is substantially equivalent to the process shown in FIGS. 6A and 6B from which S30 is omitted. Then, after calculating the charge number of sheets Nc in S63, in S19, the application 14 forwards to the printer 30 the charge instruction received from the server 50 in substantially the same manner as in the first illustrative embodiment.

Hereinabove, the illustrative embodiments according to aspects of the present disclosure have been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein.

(Other Modifications)

Figure 5:
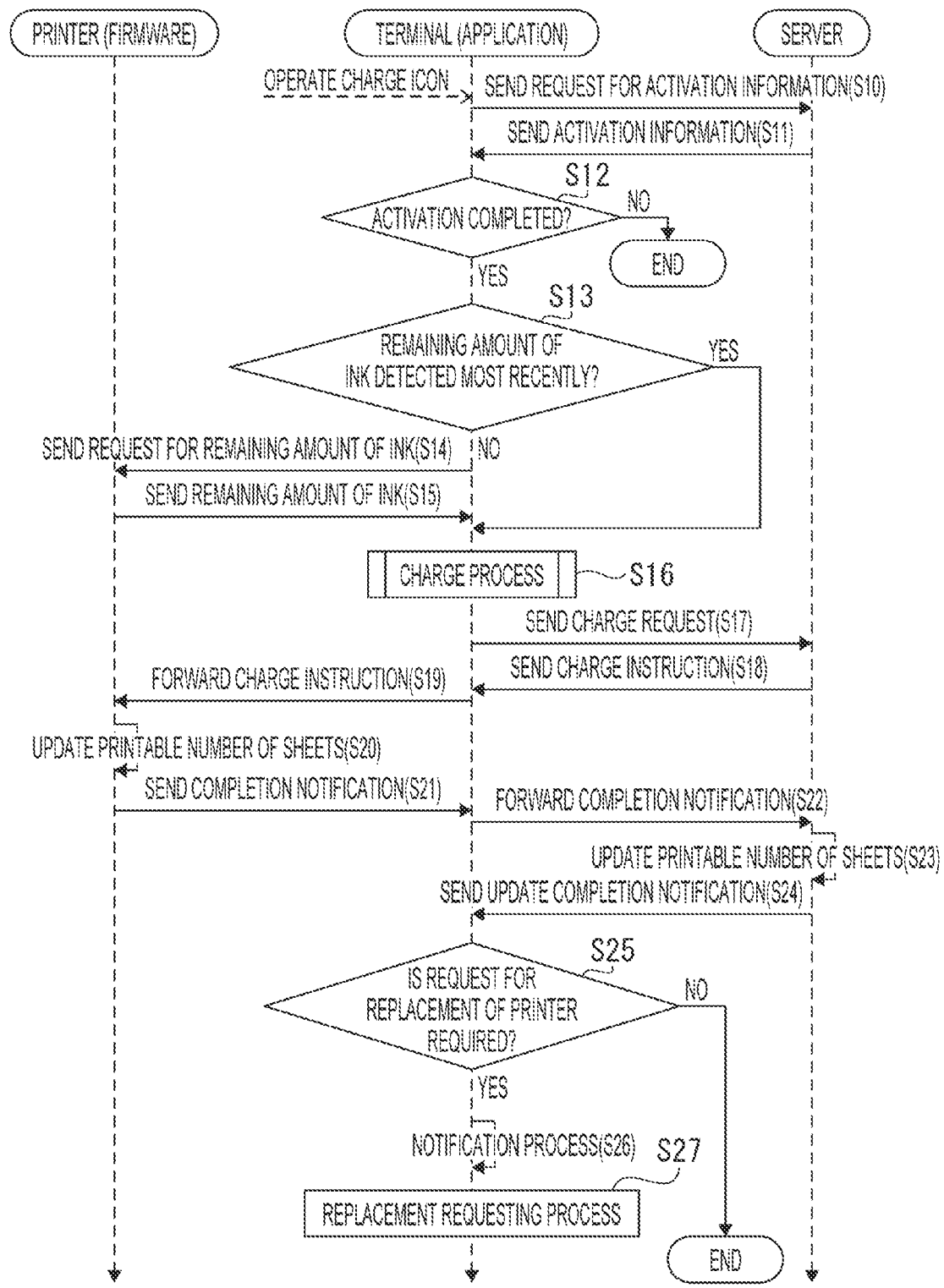
FIG. 5 is a timing chart showing a procedure to purchase a charge number of sheets.

For instance, in the process shown in each of FIGS. 5 and 12, when the printer 30 is not ready to, or is unable to perform printing due to malfunction, the application 14 may determine in S12 that the activation has not been completed for the printer 30 (S12: No) and terminate the process. Examples of the malfunction of the printer 30 may include, but are not limited to, an ink ejection failure due to a clogged nozzle and a mechanical failure of the print engine 33.

In the process shown in each of FIGS. 5 and 12, if the printer 30 stores the activation information representing whether the activation has been completed for the printer 30, in S10, the application 14 may send to the printer 30 a request for the activation information. In this case, in S11, the firmware 40 may send the activation information to the application 14.

In the user management table KT1 shown in FIG. 2, the printable number of sheets is associated with each user ID. Instead, however, the printable number of sheets may be associated with each printer 30. In this case, each item in the user management table KT1 may be associated with a corresponding one of the device IDs in the device management table KT2.

In the aforementioned illustrative embodiments, each ink tank 38 is unable to be re-filled with ink. In addition, each ink tank 38 is fixedly attached to the printer 30 in an unremovable manner. Therefore, when the remaining amount of ink in the printer 30 is about to be insufficient, the user sends to the server 50 a request for replacement of the printer 30. Instead, however, each ink tank 38 may be refillable with ink. Further, each ink tank 38 may be a cartridge configured to be removably attached to the printer 30. In this case, instead of the request for replacement of the printer 30, a request may be made for ordering an ink bottle or a cartridge in which the remaining amount of ink of a corresponding color is about to be insufficient.

In the aforementioned illustrative embodiments, consumable information used to calculate the estimated number of sheets N1 is the remaining amount of ink stored in each ink tank 38. Instead, an amount of waste liquid stored in the waste liquid box 41, or an amount of ink ejected from the recording head may be used as the consumable information representing a usage state of the consumables. In this case, a maximum amount of waste liquid storable in the waste liquid box 41 may be predetermined. The firmware 40 of the printer 30 may calculate the estimated number of sheets N1 based on a residual amount obtained by subtracting an amount of waste liquid detected by the waste liquid detector 42 from the maximum amount of waste liquid. Then, when the amount of waste liquid in the waste liquid box 41 has reached the maximum amount of waste liquid, the firmware 40 may make a request for a waste liquid box 41 (alternatively, a request for a printer 30 if the waste liquid box 41 is not configured to be removably attached to the printer 30). Moreover, the recording head may have, as a lifetime thereof, a predetermined upper limit total amount of ejectable ink. The firmware 40 may store an amount of ink ejected from the recording head each time printing is performed. Then, the firmware 40 may calculate the estimated number of sheets N1 based on a residual amount obtained by subtracting the stored amount of ejected ink from the upper limit total amount of ejectable ink. When the amount of ink ejected from the recording head has reached the upper limit total amount of ejectable ink, the firmware 40 may make a request for a recording head (alternatively, a request for a printer 30 if the recording head is not configured to be removably attached to the printer 30). Further, the firmware 40 may determine, as a final estimated number of sheets N1, the smallest one of the respective estimated numbers of sheets N1 calculated based on the remaining amount of ink stored in each ink tank 38, the residual amount obtained by subtracting the amount of waste liquid detected by the waste liquid detector 42 from the maximum amount of waste liquid, and the residual amount obtained by subtracting the stored amount of ejected ink from the upper limit total amount of ejectable ink.

The following shows examples of associations between elements exemplified in the aforementioned illustrative embodiments and modifications and elements according to aspects of the present disclosure. The terminal 10 may be an example of an "information processing device" according to aspects of the present disclosure. The printer 30 may be an example of a "printer" according to aspects of the present disclosure. The server 50 may be an example of a "server" according to aspects of the present disclosure. The printing system 100 may be an example of a "printing system" according to aspects of the present disclosure. The printer 30 may be an example of a "consumable supply" according to aspects of the present disclosure. The printable number of sheets may be an example of a "print permission amount" according to aspects of the present disclosure. The charge number of sheets Nc may be an example of an "additional print permission amount" according to aspects of the present disclosure. The estimated number of sheets N1 may be an example of a "first number of sheets" according to aspects of the present disclosure. The charge number of sheets Nc may be an example of a "second number of sheets" according to aspects of the present disclosure. What is shown on the notification screen 96 (see FIG. 9) may be included in examples of a "notification" according to aspects of the present disclosure.

What is claimed is:

1. A non-transitory computer-readable medium storing computer-readable instructions executable by a processor of an information processing device communicably connected with a printer, the instructions being configured to, when executed by the processor, cause the information processing device to:
obtain a first number of sheets that indicates a remaining number of sheets printable by the printer according to consumable information, the consumable information representing a usage state of a consumable supply for the printer, the printer being configured to perform printing until a print permission amount different from the consumable information reaches a particular threshold, the print permission amount being information regarding an amount of recording agent or sheets useable by the printer;
in response to receiving, via a user interface of the information processing device, an instruction to add an additional print permission amount to the print permission amount, obtain a second number of sheets that indicates an additional number of sheets printable by the printer according to the additional print permission amount;
determine whether the second number of sheets is more than the first number of sheets; and
when determining that the second number of sheets is more than the first number of sheets, cause the user interface to provide a notification.

2. The non-transitory computer-readable medium according to claim 1,
wherein the instructions are further configured to, when executed by the processor, cause the information processing device to:
when determining that the second number of sheets is more than the first number of sheets, receive, via the user interface, an instruction to change the additional print permission amount.

3. The non-transitory computer-readable medium according to claim 1,
wherein the instructions are further configured to, when executed by the processor, cause the information processing device to:
when determining that the second number of sheets is more than the first number of sheets, cause the user interface to provide the notification showing the first number of sheets displayed.

4. The non-transitory computer-readable medium according to claim 1,
wherein the instructions are further configured to, when executed by the processor, cause the information processing device to:
when determining that the second number of sheets is more than the first number of sheets, cause the user interface to provide the notification containing information to prompt replacement of the consumable supply.

5. The non-transitory computer-readable medium according to claim 4,
wherein the instructions are further configured to, when executed by the processor, cause the information processing device to:
send a request for replacement of the consumable supply to a server; and
when the request for replacement of the consumable supply has been sent to the server, cause the user interface to notify that it is impossible to add the additional print permission amount.

6. The non-transitory computer-readable medium according to claim 1,
wherein the instructions are further configured to, when executed by the processor, cause the information processing device to:
determine whether the printer is ready to perform printing;
when determining that the printer is ready to perform printing, receive the instruction to add the additional print permission amount via the user interface; and
when determining that the printer is not ready to perform printing, not receive the instruction to add the additional print permission amount via the user interface.

7. The non-transitory computer-readable medium according to claim 1,
wherein the instructions are further configured to, when executed by the processor, cause the information processing device to:
store print settings for the printing by the printer in history information;
obtain the consumable information from the printer; and
calculate the first number of sheets based on the obtained consumable information and the print settings stored in the history information.

8. The non-transitory computer-readable medium according to claim 7,
wherein the history information contains a remaining amount of the recording agent of each of a plurality of colors in the printer, and
wherein the instructions are further configured to, when executed by the processor, cause the information processing device to:
obtain the first number of sheets based on the remaining amount of the recording agent of a particular color; and
determine whether the second number of sheets is more than the obtained first number of sheets.

9. A printing system comprising:
a printer; and
an information processing device communicably connected with the printer,
wherein the printer is configured to perform printing until a print permission amount different from consumable information reaches a particular threshold, the print permission amount being information regarding an amount of recording agent or sheets usable by the printer, the consumable information representing a usage state of a consumable supply for the printer, and
wherein the information processing device comprises:

a user interface; and a controller configured to:

obtain a first number of sheets that indicates a remaining number of sheets printable by the printer according to the consumable information;

in response to receiving, via the user interface, an instruction to add an additional print permission amount to the print permission amount, obtain a second number of sheets that indicates an additional number of sheets printable by the printer according to the additional print permission amount;

determine whether the second number of sheets is more than the first number of sheets; and when determining that the second number of sheets is more than the first number of sheets, cause the user interface to provide a notification.

10. A method implementable on an information processing device communicably connected with a printer, the method comprising obtaining a first number of sheets that indicates a remaining number of sheets printable by the printer according to consumable information, the consumable information representing a usage state of a consumable supply for the printer, the printer being configured to perform printing until a print permission amount different from the consumable information reaches a particular threshold, the print permission amount being information regarding an amount of recording agent or sheets usable by the printer;

in response to receiving, via the user interface, an instruction to add an additional print permission amount to the print permission amount, obtaining a second number of sheets that indicates an additional number of sheets usable by the printer according to the additional print permission amount;

determining whether the second number of sheets is more than the first number of sheets; and when determining that the second number of sheets is more than the first number of sheets, causing the user interface to provide a notification.

* * * * *